United States Patent Office 2,846,306
Patented Aug. 5, 1958

2,846,306
PHOTOGRAPHIC PROCESS

John Mitchell, Stanley Ernest Orchard, Harry James Twitchett, and George Woods, Manchester, England, assignors to Imperial Chemical Industries Limited, London, England, a corporation of Great Britain No Drawing. Application June 26, 1956
Serial No. 593,813

Claims priority, application Great Britain June 1, 1955

10 Claims. (Cl. 96—11)

This invention relates to a process of protecting colour photographic elements against the action of ultraviolet light by the employment of colourless or weakly coloured monoazo compounds.

The types of dyestuff used in colour photographic processes are usually of only moderate fastness to light. These dyes are degraded on exposure to light with the result that the multi colour images fade but as each dye may fade at an unequal rate to a different extent the original colour balance may be distorted with undesirable effects.

The hitherto described compounds have been found to be not entirely satisfactory owing to, for example, insufficient ultraviolet light absorption, undesirable visible light absorption, strong fluorescence, inadequate stability, or incompatibility with the medium in or on which they are to be employed.

We have now found that a certain class of monoazo compounds absorb ultraviolet light strongly and are outstandingly free from these defects.

Thus according to the present invention we provide a process for enhancing the fastness to light of colour photographic materials, which comprises treating the photographic material with at least one monoazo compound of the formula $$A-N=N-\underset{\underset{\text{COOAlkyl}}{|}}{\overset{\overset{X}{|}}{C}}-H$$

wherein A stands for a benzene nucleus carrying at least one negative substituent and X stands for —CN, —COCH₃ or —COOAlkyl.

As examples of negative substituents which may be present in the benzene nucleus, A, we mention —Cl, —Br, —CN, —CF₃, —COOH, —COOAlkyl, —SO₃H, —CO.C₆H₅, —SO₂Alkyl, —SO₂NRR′ and —CONRR′ wherein R and R′ stand for hydrogen, alkyl, cycloalkyl, aryl or aralkyl and may be the same or different.

A lower alkyl group may also be present in the benzene nucleus, A, provided that at least two negative substituents as described above are present at the same time.

The alkyl groups in the above general formula are preferably those containing up to 4 carbon atoms.

The monoazo compounds used in the process of this invention may be prepared by conventional methods for preparing azo compounds, using as starting materials an aromatic amine of the formula A—NH₂ wherein A has the significance stated above and a coupling component of the general formula

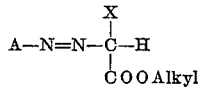

As examples of aromatic amines of the formula A—NH₂ there may be mentioned aniline-2:5-disulphonic acid, 3-aminobenzenesulphonamide, 4-aminobenzenesulphon-N-methylanilide, anthranilic acid, 4-chloroanthranilic acid, mono- and dichloroanilines, m-aminobenzoic acid, methylanthranilate, sulphanilic acid, orthanilic acid, metanilic acid, 4-chloroaniline-3-sulphonic acid, 2-chloro-4-aminotoluene-5-sulphonic acid and isomers thereof, 3-aminobenzenesulphon-N-dimethylamide, 3-amino-4-ethanesulphonyl-benzotrifluoride.

As examples of coupling components of the general formula

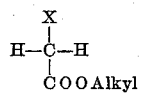

there may be mentioned esters of cyanacetic, malonic or acetoacetic acids.

Such monoazo compounds as contain —COOH or —SO₃H groups may be used either in the form of the free acids or as a metallic salt.

Such monoazo compounds of the above general formula as are derived from diazotisable amines A—NH₂ wherein the benzene nucleus, A, contains a —COOH substituent in ortho position to the group —NH₂ can form co-ordination metal complexes with certain metals such as chromium and nickel. The use of such metal complexes is included within the scope of this invention.

The treatment of the colour photographic material, especially multi-layer colour photographic material, by the process of this invention may be carried out at any stage during the manufacture or processing of the material but it is a preferred feature of the invention to carry out the treatment after the usual processing steps, that is to say after the steps of developing, bleaching, fixing and washing, using a solution of the monoazo compound in water having a pH between 6.0 and 10.5. The washed prints for example on a paper base or a transparent film base may be immersed in such a solution at a temperature conveniently of between 10° C. and 30° C. The fastness to light of the dyestuff images is thereby considerably improved and the tendency of the processed multi-layer colour photographic materials to become stained in those parts of the material which contain little or no colour image, is suppressed.

The monoazo compounds may also be incorporated in clear lacquers, for example those based on cellulose nitrate, cellulose esters, polymerised butylmethacrylate and the like and employed for supercoating coloured photographic prints.

The invention is illustrated but not limited by the following examples in which parts and percentages are by weight.

Example 1

Exposed multilayer photographic paper is developed in a solution of the following composition:

| | Parts |
|---|---|
| 5-diethylamino-o-toluidine hydrochloride | 2 |
| Hydroxylamine hydrochloride | 1 |
| Sodium carbonate | 50 |
| Sodium sulphite | 1 |
| Potassium bromide | 1 |

Water to make 1000 parts.

The paper is rinsed in water and then immersed in a stop-bath of the following composition:

| | Parts |
|---|---|
| Sodium acetate | 25 |
| Glacial acetic acid | 15 |

Water to make 1000 parts.

The paper is washed in water and immersed in a bleaching bath of the following composition:

| | Parts |
|---|---|
| Potassium ferricyanide | 100 |
| Sodium dihydrogen phosphate | 50 |
| Potassium bromide | 25 |

Water to make 1000 parts.

The paper is again washed in water and hardened in a bath of the following composition:

| | Parts |
|---|---|
| Potassium alum | 30 |
| Sodium thiosulphate | 100 |
| Sodium benzene sulphinate | 2 |
| Sodium acetate | 60 |
| Water to make 1000 parts. | |

The paper is washed in water, immersed for four minutes in the following solution, squeezed and dried.

| | Parts |
|---|---|
| Diethyl-3-chloro-4-methyl-6-sulphophenylazomalonate | 7.5 |
| Water to make 1000 parts. | |

The pH of the monoazo compound solution is preferably adjusted to between 8.5 and 10.5 by the addition of sodium carbonate as required.

Although the solution of the monoazo compound is most conveniently used as the final stage of processing, after the final wash, if the multilayer colour print or other multilayer colour image has been dried, the monoazo compound may be applied after drying and the print redried.

It has been found that multilayer colour prints so treated may be exposed to daylight up to four times as long as untreated prints before a significant change in color balance or yellowing of the whites occurs.

*Example 2*

A multi-layer light-sensitive photographic paper is made up as follows:

A paper support material is coated with a layer of green-sensitive silver halide emulsion containing 1% of the magenta colour-forming component 1-(3'-carboxyphenyl)-3(4'-stearyl-aminophenyl)-5-pyrazolone sodium salt. Upon this layer there is coated a red-sensitive silver halide emulsion containing 1% of the sodium salt of the cyan colour forming component 1-hydroxy-4-sulpho-2-naphthoyloctadecylamide, and finally a layer of unsensitised (that is, blue-sensitive) silver halide emulsion, containing 1% of the sodium salt of the yellow colour forming component, 4'-stearyl-aminobenzoylacetylanilide-3:5-dicarboxylic acid is coated. The paper is exposed to light from a coloured image, processed by the method of Example 1 and dried after the final wash.

An ultra-violet absorbing protective lacquer, prepared as follows, is applied over the top layer by brushing, spreading, spraying, dip coating, etc., to form a continuous even coating.

0.5 part of the compound diethyl-2-carboxy-5-chlorophenylazomalonate is added slowly to 22 parts of xylene maintained at 40° C. When the compound is completely dissolved the solution is filtered and the filtrate is poured with stirring into 22 parts of a 16% solution of polymerised butyl methacrylate in xylene. The coated colour print is exposed to daylight with a similar print without the ultra-violet absorbing lacquer. It is found that the coated print fades at about one-third the rate of the uncoated print, and furthermore the useful exposed life of the coated print is further extended because the three dyestuffs now fade more nearly in balance.

What we claim is:

1. A finished photographic element comprising a base having thereon at least one developed and fixed photographic emulsion layer containing a dye image subject to fading by the action of ultraviolet radiation, and at least one ultraviolet absorbing monoazo compound of the formula:

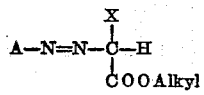

wherein A is a benzene nucleus carrying at least one negative substituent selected from the group consisting of —Cl, —Br, —CN, —CF$_3$, —COOH, —COOAlkyl, —SO$_3$H, —CO.C$_6$H$_5$, —SO$_2$Alkyl, —SO$_2$NRR' and —CONRR' wherein R and R' are selected from the group consisting of hydrogen, alkyl, cycloalkyl, aryl and aralkyl and X is selected from the group consisting of —CN, —COCH$_3$, and —COOAlkyl.

2. A finished photographic element as claimed in claim 1 including three superposed, developed and fixed photographic emulsion layers containing dye images, at least one of said dye images being subject to fading by the action of ultraviolet radiation.

3. A finished photographic element comprising a base having thereon at least one developed and fixed photographic emulsion layer containing a dye image subject to fading by the action of ultraviolet radiation, and a coating on said layer comprising at least one ultraviolet absorbing monoazo compound of the formula:

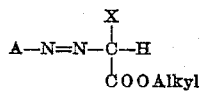

wherein A is a benzene nucleus carrying at least one negative substituent selected from the group consisting of —Cl, —Br, —CN, —CF$_3$, —COOH, —COOAlkyl, —SO$_3$H, —CO.C$_6$H$_5$, —SO$_2$Alkyl, —SO$_2$NRR' and —CONRR' wherein R and R' are selected from the group consisting of hydrogen, alkyl, cycloalkyl, aryl and aralkyl and X is selected from the group consisting of —CN, —COCH$_3$, and —COOAlkyl.

4. A finished photographic element as claimed in claim 1 wherein the alkyl groups in said formula contain up to 4 carbon atoms.

5. A method of preventing image degradation in a finished photographic element comprising a base having at least one developed and fixed photographic emulsion layer thereon containing a dye image subject to fading by the action of ultraviolet radiation, said method comprising the steps of treating said element with at least one monoazo compound of the formula:

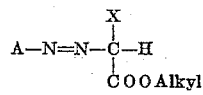

wherein A is a benzene nucleus carrying at least one negative substituent selected from the group consisting of —Cl, —Br, —CN, —CF$_3$, —COOH, —COOAlkyl, —SO$_3$H, —CO.C$_6$H$_5$, —SO$_2$Alkyl, —SO$_2$NRR' and —CONRR' wherein R and R' are selected from the group consisting of hydrogen, alkyl, cycloalkyl, aryl and aralkyl and X is selected from the group consisting of —CN, —COCH$_3$, and COOAlkyl.

6. The method of claim 5 wherein said element is treated, after development and fixation, with an aqueous solution of said monoazo compound having a pH between 6.0 and 10.5.

7. The method of claim 6 wherein said treatment is carried out at a temperature between 10° C., and 30° C.

8. The method of claim 5 wherein said treatment comprises coating said element, after developing and fixing, with a clear lacquer containing said monoazo compound.

9. A finished photographic element as claimed in claim 1 wherein said monoazo compound is diethyl-3-chloro-4-methyl-6-sulphophenylazomalonate.

10. A finished photographic element as claimed in claim 1 wherein said monoazo compound is diethyl-2-carboxy-5-chlorophenylazomalonate.

References Cited in the file of this patent

UNITED STATES PATENTS

| 2,632,701 | Salminen et al. | Mar. 24, 1953 |
| 2,747,996 | Edgerton et al. | May 29, 1956 |